(12) United States Patent
Giannias

(10) Patent No.: US 6,485,083 B1
(45) Date of Patent: Nov. 26, 2002

(54) NET SAFETY TOP FOR TRAILERS

(76) Inventor: Dennis Giannias, 40R Sabino Farm Rd., Peabody, MA (US) 01960

( * ) Notice: Subject to any disclaimer, the term of this patent is extended or adjusted under 35 U.S.C. 154(b) by 0 days.

(21) Appl. No.: 09/925,794

(22) Filed: Aug. 9, 2001

Related U.S. Application Data

(60) Provisional application No. 60/224,226, filed on Aug. 10, 2000.

(51) Int. Cl.$^7$ .................................................. B60F 7/02
(52) U.S. Cl. .............................. 296/100.16; 296/100.18
(58) Field of Search ..................... 296/225, 98, 100.16, 296/136, 211, 100.15, 100.17, 100.18; 410/117, 118, 97

(56) References Cited

U.S. PATENT DOCUMENTS

| | | | | |
|---|---|---|---|---|
| 4,909,563 A | * | 3/1990 | Smith | 296/98 |
| 5,040,934 A | * | 8/1991 | Ross | 296/100.16 X |
| 5,137,324 A | * | 8/1992 | Hershberger | 296/100.16 |
| 5,401,074 A | * | 3/1995 | Timerman | 296/136 |
| 5,697,664 A | * | 12/1997 | Chenworth | 296/98 |
| 5,716,176 A | * | 2/1998 | Anderson | 296/100.16 X |
| 6,053,556 A | * | 4/2000 | Webb | 296/98 |
| 6,089,645 A | * | 7/2000 | Haddad, Jr. | 296/98 |

* cited by examiner

Primary Examiner—D. Glenn Dayoan
Assistant Examiner—Jason Morrow
(74) Attorney, Agent, or Firm—Perkins, Smith & Cohen, LLP; Jerry Cohen; Peter J. Borghetti

(57) ABSTRACT

A net is located on the top surface of a truck trailer or box body on a truck that traps and holds in place snow or ice that forms on the flat tops of the truck or trailer. The mesh of the net aids in breaking up the snow or ice into smaller lumps and thus redices the hazard from sheet of ice or snow slipping from the top of trucks or trailers as they travel on highways. A plastic or rope mesh material held above the surface of the truck or trailer top is preferred.

11 Claims, 6 Drawing Sheets

NET SAFETY TOP FOR TRAILERS

CROSS REFERENCE TO RELATED APPLICATIONS

This application claims priority of Provisional Application No. 60/224,226; entitled "NET SAFETY TOP FOR TRAILERS" filed on Aug. 10, 2000, and which is incorporated herein by reference.

BACKGROUND OF THE INVENTION

This invention shows a cover for box style trailers that may be deployed on a permanent basis or unfurled as a cover for the trailer closed top that has mesh to hold and break into small lumps any snow or ice that collects on the top surface of the trailer.

DESCRIPTION OF PRIOR ART

The problem of debris or other material falling from open trucks loaded with garbage, gravel, dirt or other materials is a long and well documented problem that has resulted in a series of State and Federal requirements for covers on open trucks. The covers both hinder the escape of lumps or pieces of the contents of the open trucks and lowers the emission of particulates removed by the wind of passage. The rules cover such diverse materials as asphalt and corn shipments where covers reduce air polluting dust and vapors to gravel and garbage trucks where material blown out of the truck can hit and damage or hinder vision of other vehicles traveling on roads behind or alongside these open trucks.

There is a problem that is similar in hazards and effects with closed box tractor-trailers. These long flat top trailers in colder times and climates accumulate snow and ice when they are parked in inclement weather. The accumulation that can easily be several inches of ice of up to a foot or more of snow is not easily removed due to the flimsy structure of the trailer box and to the height and lack of access to the trailer box top.

The problem of snow or ice falling from truck tops has caused several serious accidents and there are consistent claims of cars with broken windshields and several reports of injury due to impact of snow and ice falling from the top of trailers.

At present the key art is based upon open truck covers. It consists of safety systems for vehicles and tarpaulin systems where in most cases novel methods of attaching a tarp to the top of an open truck by means of a fixed or traveling unroller and rewinder are employed. The recent U.S. Pat. No. 5,211,440 is typical where moving a handle allows a tarpaulin to be moved from a stored position to its uncovered position, the system being considered in the patent as a safety system.

Another type of truck cover is shown by Dimmer et al in U.S. Pat. No. 4,302,043 where a sidewise tarp is pulled by an unrolling cylinder attached to a universal joint to allow the rotation of the tarp containing cylinder over a series of supports or ropes along the top of an open, full height sided truck thus unfurling the tarp. There are many other systems that cover rolling or unrolling a tarp.

The phrase snow screen does occur in the patent literature as in U.S. Pat. No. 5,564,770 but while the phrase could cause confusion with the concepts herein, snow screens are a windshield covering structure that has interfilding and storing capabilities when the snowscreen is withdrawn. In these usages the word screen is used in the context of covering or blocking material sheltering a surface (windshield) from snow contact. Snow screens in the context of covers for windshields have become popular and exist with magnetic clips, as folded vinyl mats, and as various sun screen configurations.

The problem of snow buildup has been noted in aircraft where a variety of systems to deice or to blow ice from sensitive surfaces by use of flexing membranes, by mechanical disruption or by heat or solvent are known and used in today's aircraft. In these applications removal of ice totally is required and the form of the removal and the effect of standing snow or ice buildup is not directly addressed since ice covered surfaces just do not work effectively.

Shipboard buildup of ice is also noted but again the rapid removal of ice buildup to prevent top heavy structures is the thrust of the technology and the form of removed material is not a concern with the ocean as a dumping area.

SUMMARY OF INVENTION

This invention shows the deployment of a mesh containing top cover that is held slightly above the top surface of the trailer. The mesh containing cover has free spacing in the cells of the mesh such that any snow or ice that forms on the top of the trailer engages the mesh surface and is held by the mesh until such time it breaks up into mesh sized lumps and falls from the top of the trailer to the ground or road. The device thus prevents large slabs or lumps of snow or ice from falling from the top of trailers and hitting other vehicles.

Shoveling or even steam removal or automatic brushing of the top of trucks after each snowstorm or ice storm can of course accomplish the problem of minimization of damage from ice and snow on top of trucks. In actual practice the drivers are unlikely to do this since getting up on the ice covered truck is risky and the use of automated equipment is an avoidable cost to the truck owner or operator.

This invention provides a truck topping mesh layer supported a distance of one-eighth inch to six inches from the top of the truck on standoffs or rib-like frames. Since the truck top is an open mesh, the bulk of ice and snow falls through the mesh and is held on top of the truck as the truck starts on a trip. As the truck speeds up, normally the snow and ice would gradually get shaken loose and on a turn, a slowing or an acceleration period, the now loose snow would slip to one side of the truck body in one of more large sheets and fall to the ground. Sometimes there would be a car near that would be hit by the falling sheet of ice or snow. With this invention the mesh prevents the snow or ice layer from sliding to one side of the trailer. As the ice or snow layer becomes loosened from the trailer top, the mesh holds it. As the truck further speeds and wind and evaporation lighten and further loosen the snow or ice layer, the layer breaks up along the mesh cell boundaries and chunks and lumps that are about the size of the mesh break free and fall to the ground rather than large chunks or slabs. The smaller lumps are much less likely to cause harm than the large slabs and chunks. The buildup of ice would also be held in place, ice being more dense and harder to break, the ice would be held as it sublimates by action of the wind and truck speed. Ice would thus be held in place until it melts or breaks into small chunks.

The truck top mesh is held onto the truck in one of several ways. It can be attached to rails along the long axis of the truck, the rails providing further protection against sidewise slab slips. The mesh can also be held by standoffs located along the trailer top edges and throughout the top of the trailer. The standoffs, typically bolted or screwed on metal rods that have top clamps to grip the mesh, are one inch to 6 inches high and provide the required space above the trailer top to make the invention functional.

A considerable advantage to the truck mesh top is that it rapidly breaks up the snow or ice layer, thus rapidly lightening the truck and it further is removable for the 8 to 9 months when snow is unlikely. Being mesh, it has a low wind drag and in fact would fall within the envelope of static air formed by front cowlings on trucks that reduce wind drag effects.

DETAILED DESCRIPTION OF PREFERRED EMBODIMENTS

The present invention is now described more fully hereinafter with reference to the accompanying drawings, in which the preferred embodiment of the invention is shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
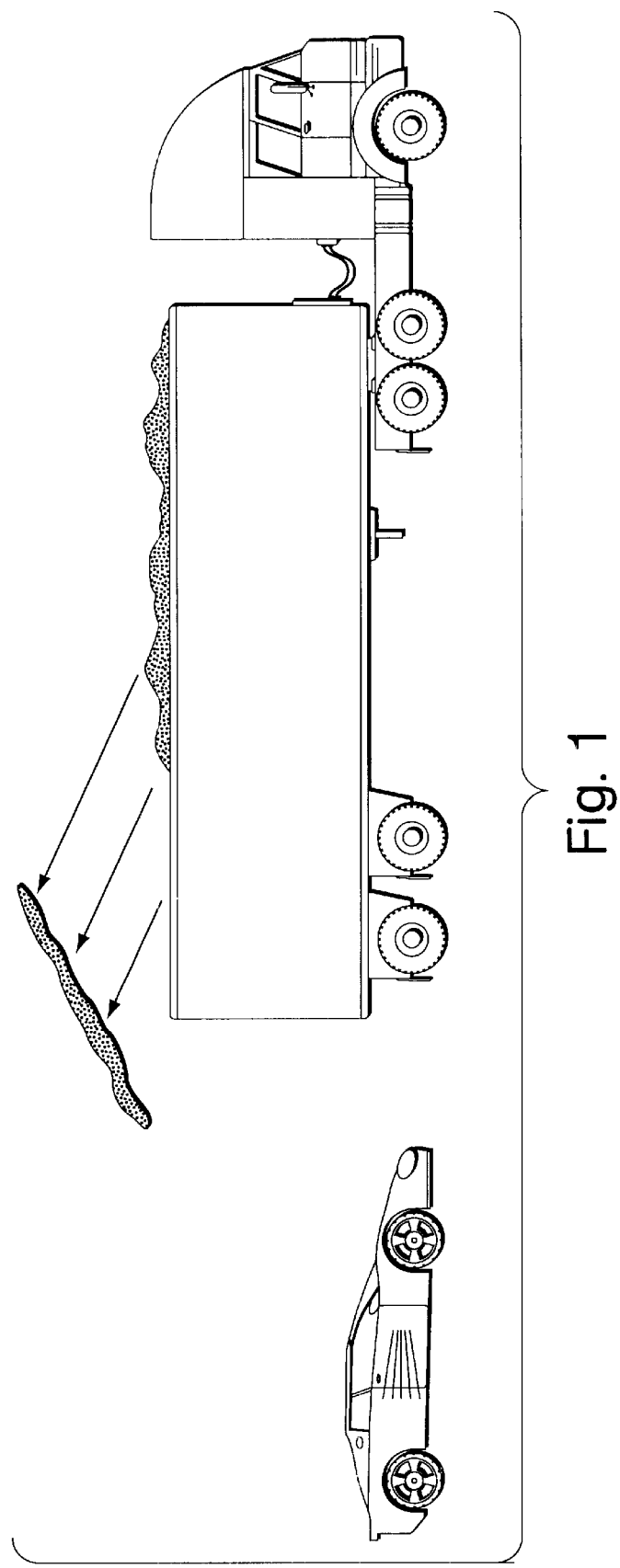
FIG. 1 is a pictorial of a slab of snow or ice blowing off a typical trailer and into the path of a following vehicle.

The preferred embodiment of the above invention provides a mesh structure, being generally indicated by numerical designation 1, illustrated in the accompanying drawings, which preferably is adapted to a conventional tracker-trailer or flat top of a motor vehicle for the prevention of the accumulation of large sheets of snow or ice. FIG. 1 illustrates a typical blowoff of snow or ice from the top of a tracker-trailer potentially hitting smaller vehicles following or traveling near the flat top motor vehicle.

Figure 2:
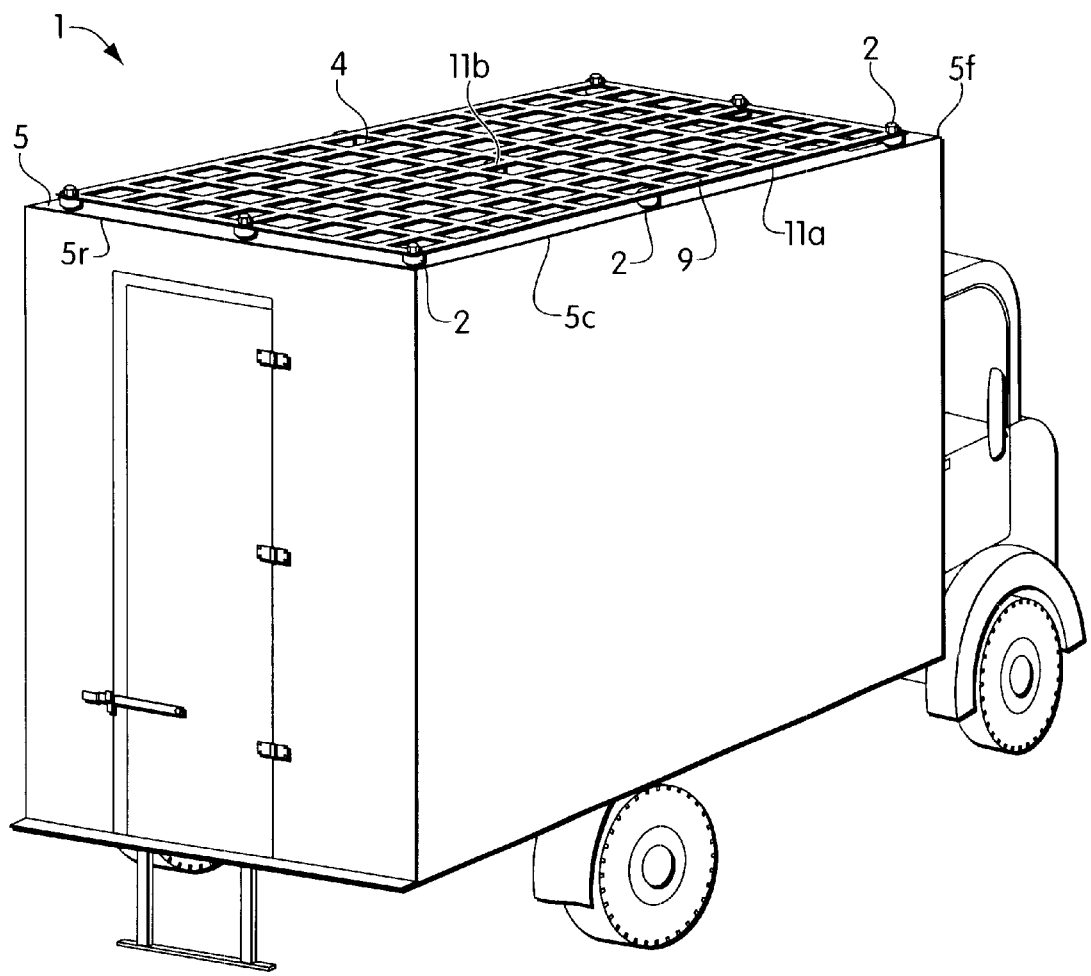
FIG. 2 is a pictorial view of the present invention adapted to the top of a typical box truck illustrating the the standoffs forming a space or gap between the flat top and the net.

Now turning to FIG. 2, the structure 1 preferably includes a plurality of standoffs 2 to attach a net 4 to a motor vehicle flat top 5. The standoffs 2 create a gap 9 formed by the net 4 and the motor vehicle flat top 5. The gap 9 is preferably one-half to three inches, but can be up to six inches. The standoffs 2 are positioned near the edges 11a and center 11b of the net 4, thereby supporting the net 4 at the front 5f and rear 5r ends of the motor vehicle flat top 5, as well as the center portion 5c of the motor vehicle flat top 5.

Each standoff 2 is preferably a block of plastic or metal that has U shaped bolts to grip the net 4 and further bolts or clamps to attach the standoffs 2 to the flat top 5. Standoffs 2 can be in any form such as clips, bars, rods, and molded parts.

Figure 3:
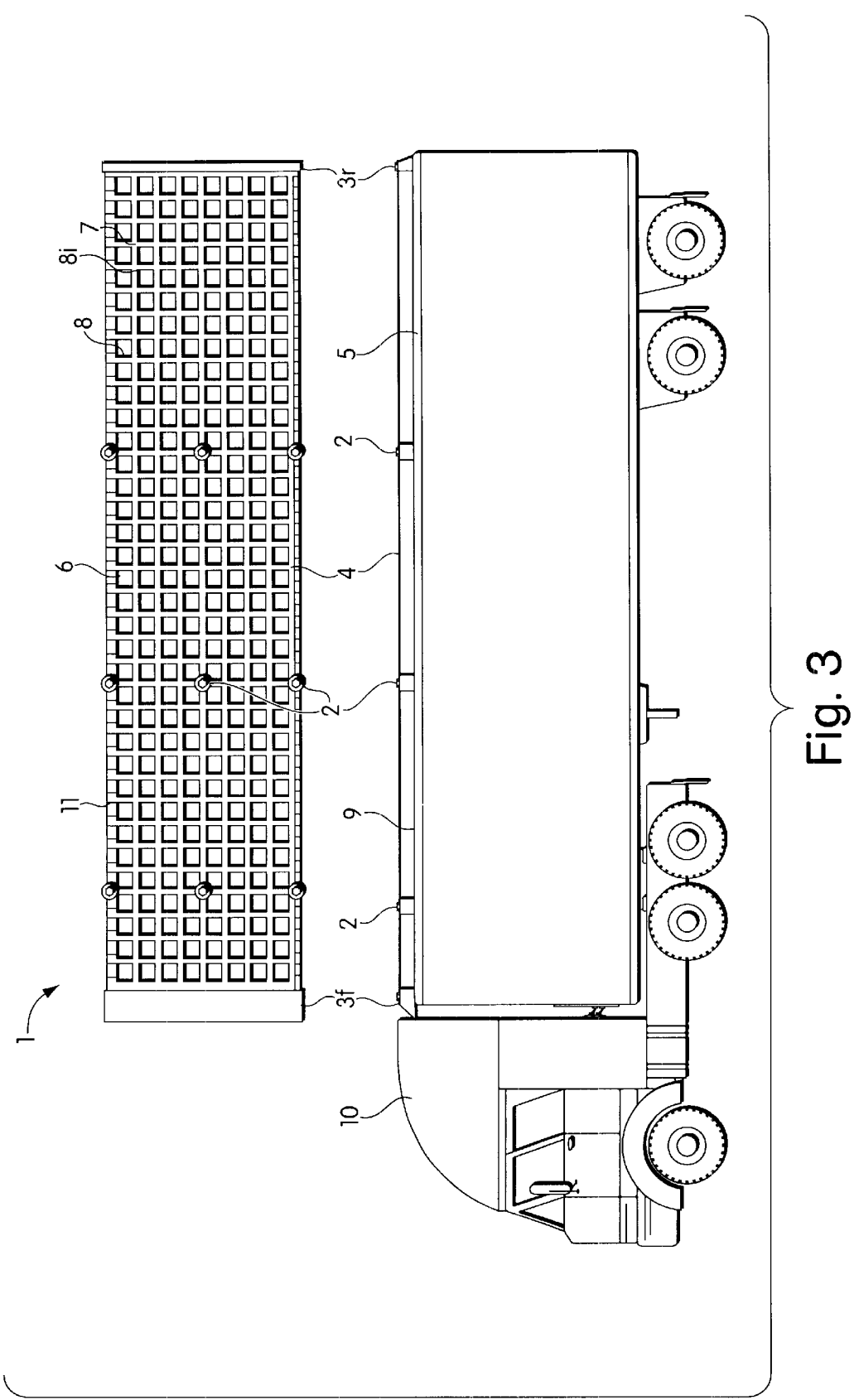
FIG. 3 is a side view of the present invention adapted to the top of a typical trailer illustrating the space or gap formed between the trailer top and the net by the standoffs or supports.
Figure 4A:
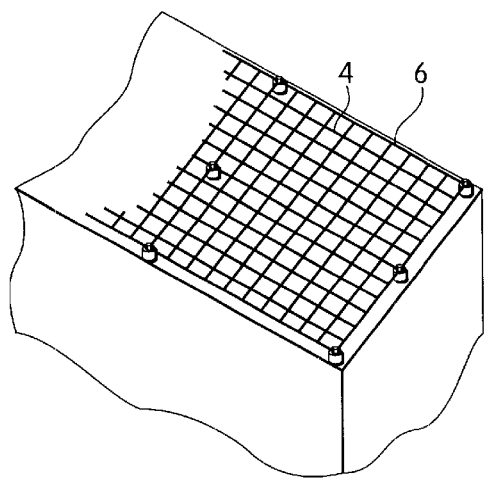
FIGS. 4a–c are pictorial views illustrating the various mesh orientations of the net.
Figure 4B:
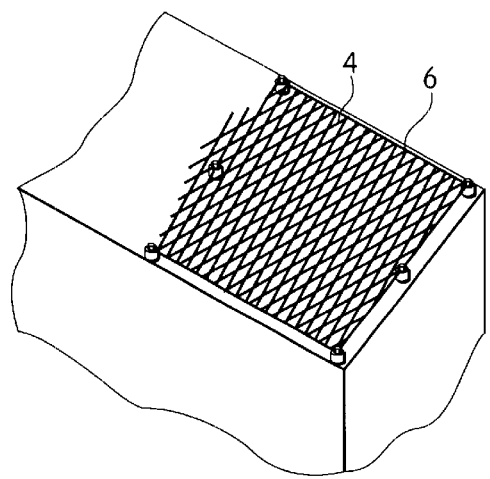
Figure 4C:
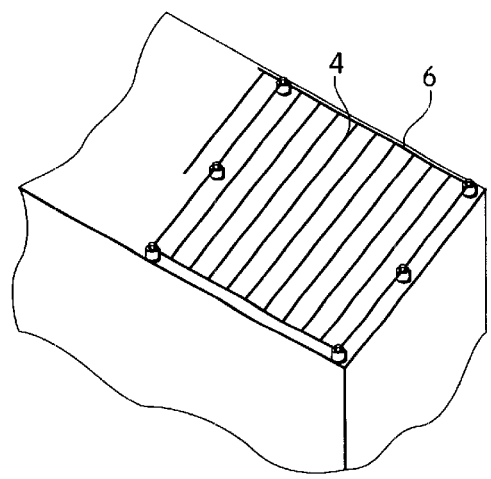

The net 4 is made of any suitable material that is flexible and durable, such as fish net, fibrillated plastic, bidirectionally oriented plastic mesh, loose weave fabric, knotted batik netting, wire screen, wire mesh, and knotted rope or string. The net 4 is preferably an extruded, UV s tabilized nylon or polyolefsin. As illustrated in FIG. 3, the net 4 consists of members or strands, 7 and 8, going in two directions with frequent points of intersection 8i such that they form open spaces or meshes 6. The net 4 may be further reinforced at the edges or other points with thicker strands or members as shown at the edge 11. The net 4 preferably has mesh sizes from 1-inch square to three by five inches, however one skilled in the art can determine the optimal size deterministically or empirically. In FIGS. 4a–4c a variety of different mesh orientations and shapes are shown from squares (FIG. 4a) to diamonds (FIG. 4b) to rectangles (FIG. 4c). While not covering all types of possible mesh shapes, it is evident that a wide variety of mesh configurations can perform the ice and snow-retaining feature of the present invention. Small clots of snow are preferred since dislodging of large sleets of snow or ice at a single moment is less favored than the release of small clots of snow or ice over a 10 to 50 mile period. Criteria for mesh selection and size are the retention of snow or ice as the flat top motor vehicle accelerates and decelerates from operating speeds, the size of the clots of snow or icy crust that the airspeed dislodges, and the material of mesh construction.

Now returning to FIG. 3, one alternative embodiment holds the net 4 off the motor vehicle flat top 5 by a leading edge clamp 3f and a trailing edge clamp 3r. The standoffs 2 are conventionally fastened to the net 4 to hold the net 4 slightly off the motor vehicle flat top 5, forming gap 9, so that the snow or ice can become embedded into and below the net 4. The standoffs 2 can be conventionally mounted on the flat top 5 and provide a channeling of the wind of passage or can be only affixed to the net 4 so it is in place without any locational problems.

The weight/gas consumption of snow or ice load versus safety of snow or ice unloading is important considerations. The net 4 will cause a drag on the trailer even though it is partially shielded by the typical fairing 10 on the top of the truck cab. The space within the truck fairing 10 is a likely storage area when the net 4 is not in use. However, when the net 4 is deployed on the flat top 5, the cost of added drag is offset by reduced insurance/liability claims, reduced snow weight, and the use of a safety system, like the present invention, may be mandated by regulations if the future. Most importantly, the breakup of ice and snow sheets can curb accidents causing damage to vehicles, injury and death to drivers of automobiles. Since the net will cause drag, the application and removal of the net are important secondary factors.

Figure 5:
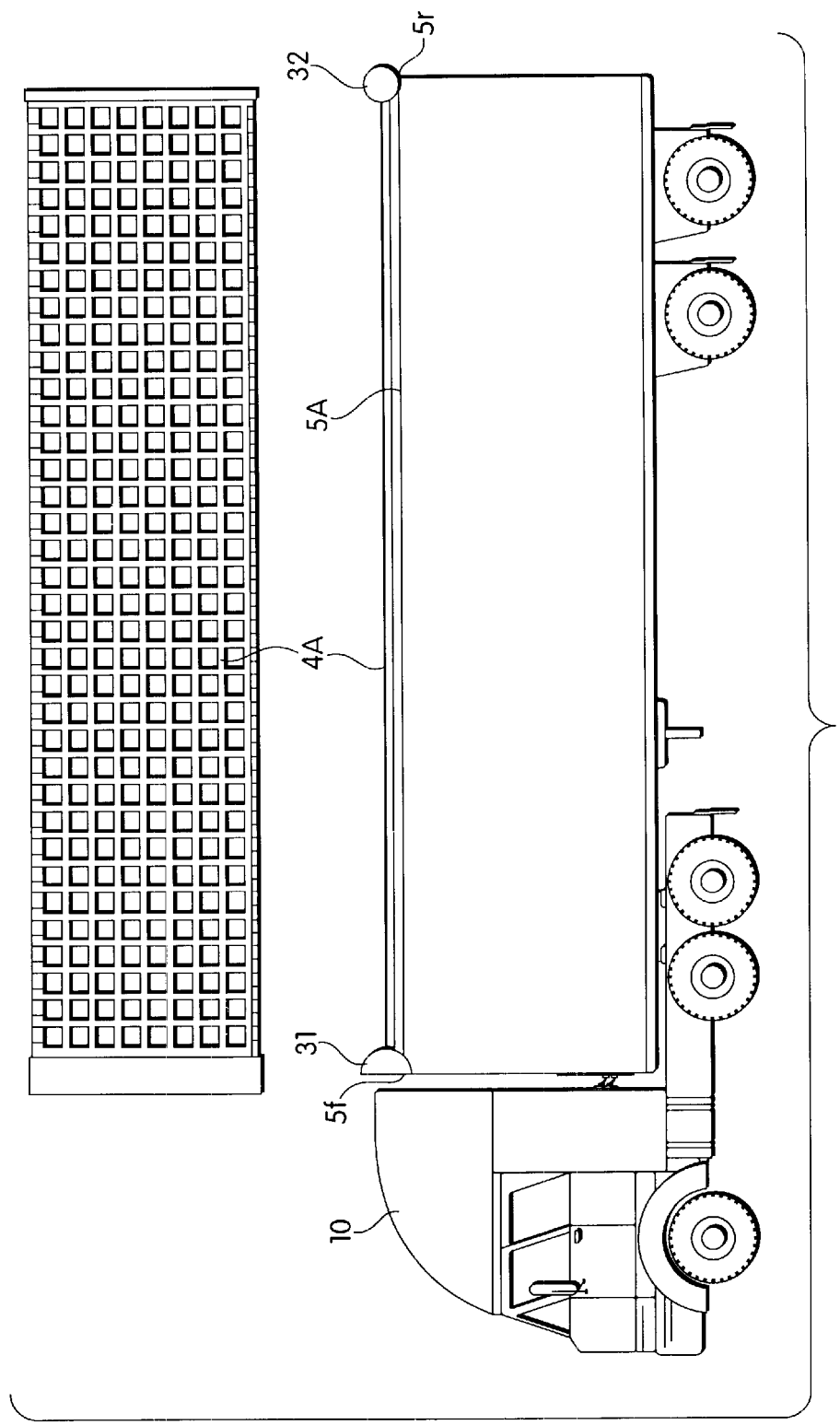
FIG. 5 is a side view of an alternative embodiment of the present invention adapted to the top of a typical trailer illustrating the space or gap formed between the trailer top and the net by forward and rear attachment devices.

Now turning to FIG. 5, another alternative embodiment can deployed and retracted the net 4A in very adverse temperature and precipitation conditions so going to the top 5A of the trailer is not needed. The net 4A is stored on a roller/storage area 31 at the front end 5f of the flat top 5A and near the fairing 10. The net 4A is rolled out from the roller 31 and stretched along the top 5A of the truck to an end griping fastened 32 attached to the rear 5f of the top 5A. The net 4A is rolled back into the roller 31 when not in use to reduce drag. The net 4A can be on tracks attached to and between the roller/storage area 31 and end griping fastened 32. A mast or support can be deployed from ground level to locate and move the net 4A on the flat top 5A of the motor vehicle.

Figure 6:
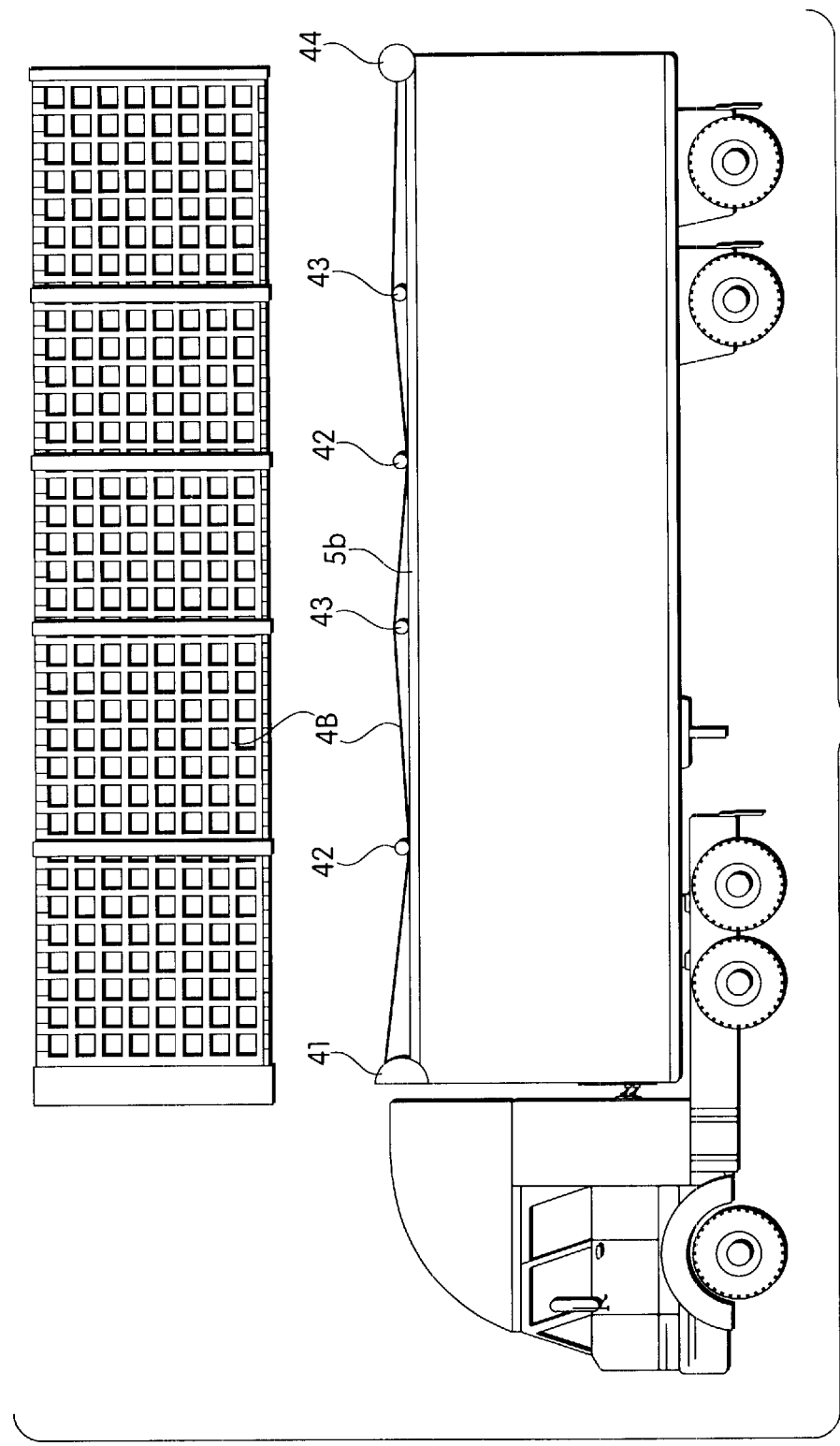
FIG. 6 is a side view of another alternative embodiment of the present invention adapted to the top of a typical trailer illustrating the variable space or gap formed between the trailer top and the net by alternating sets of hold downs and spacers.

Now turning to FIG. 6, another alternative embodiment allows the net 4 to touch the surface of the flat top 5B in several places and is strung between spacers or rollers that act as holddowns 42 or spacers 43. An end-gripping device 44 is also provided along with front-gripping device 41 to hold the end of the net 4B to the trailer top 5b. It is noted that the varying heights of the mesh material provide improved grip for small and large amounts of snow or ice while still preventing the slab slideoff that is dangerous to automobiles. The net 4b can be on tracks and masts or supports can be deployed from ground level to locate and move the net 4b on the flat top 5b of the motor vehicle.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

I claim:

1. A combination of a snow and ice restraint device and a vehicle, said combination comprising:

said vehicle having a substantially flat top with a front edge and a rear edge;

said device including a mesh structure having a plurality of openings; and said mesh structure being removably affixed to said vehicle above said flat top, whereby said mesh structure acts to restrain snow and ice from sliding off said flat top in large sheets.

2. The combination as defined in claim 1 further comprising holding means for disposing said mesh structure above said flat top of said vehicle, wherein said holding means is fixedly attached to said flat top of said vehicle, wherein said mesh structure is attached to said holding means at a predetermined height above said flat top of said vehicle.

3. The combination as defined in claim 1 wherein said mesh structure is disposed up to six inches above said flat top of said vehicle.

4. The combination as defined in claim 2 wherein said holding means are a plurality of standoffs, whereby said plurality of standoffs hold said mesh structure up to six inches above said flat top of said vehicle.

5. The combination as defined in claim 2 wherein said mesh structure is removable from said holding means.

6. The combination as defined in claim 2 wherein said holding means further comprising:

at least one roller rotatably attached to said flat top of said vehicle, a forward mesh gripping device attached to the front edge of said vehicle, a rear mesh gripping device attached to the rear edge of said vehicle, wherein said mesh structure is interlaced between said at least one roller and attached to and between said forward mesh gripping device and said rear mesh gripping device.

7. The combination as defined in claim 6 wherein said forward mesh gripping device includes a storage area to stow said mesh structure, whereby said mesh structure is safely stored in said storage area when not in use.

8. The combination as defined in claim 4 wherein said plurality of standoffs are selected from a group consisting of metal supports, plastic supports, metal clips, plastic clips, metal rods, plastic rods, metal bars, plastic bars, metal molded parts, and plastic molded parts.

9. The combination as defined in claim 1 wherein said mesh structure is selected from a group consisting of fish net, fibrillated plastic, bidirectionally oriented plastic mesh, loose weave fabric, knotted batik netting, wire screen, wire mesh, and knotted rope or string.

10. A combination of a snow and ice restraint device and a vehicle, said combination comprising:

said vehicle being a trailer having a flat top;

said device including a mesh structure mounted at a predetermined distance above said flat top of said trailer; and said mesh having a plurality of openings of five inches in width or less but more than one inch;

whereby said combination ensures that snow and ice breaks into small non harmful lumps prior to falling off said flat top of the trailer.

11. A method to restrain snow and ice from sliding off a vehicle having a flat top in large sheets comprising the steps:

providing a mesh structure having a holding means; and attaching the mesh structure to the flat top by the holding means at a predetermined height with respect to the flat top of the vehicle, whereby snow and ice falling on the flat top is essentially prevented from sliding off the top in large sheets.

* * * * *